United States Patent [19]

Sharp et al.

[11] 4,179,166
[45] Dec. 18, 1979

[54] ANTI-LOCK VEHICLE BRAKE SYSTEM WITH VARIABLE DECAY RATE

[75] Inventors: Denis Sharp; Derek R. Skoyles, both of East Grinstead, England

[73] Assignee: U.S. Philips Corporation, New York, N.Y.

[21] Appl. No.: 684,800

[22] Filed: May 10, 1976

Related U.S. Application Data

[63] Continuation of Ser. No. 421,511, Dec. 4, 1973, abandoned, which is a continuation of Ser. No. 154,487, Jun. 18, 1971, abandoned.

[30] Foreign Application Priority Data

Jun. 26, 1970 [GB] United Kingdom ............... 31129/70
May 12, 1971 [GB] United Kingdom ............... 31129/71

[51] Int. Cl.² ............................................. B60T 8/02
[52] U.S. Cl. ................................... 303/119; 303/116
[58] Field of Search ............... 303/113, 114, 115, 116, 303/117, 118, 119, 10, 61–63, 68–69, 81, 83, 72, 73, 87; 188/181 A; 137/504, 505, 480

[56] References Cited

U.S. PATENT DOCUMENTS

| 2,865,397 | 12/1958 | Chenault | 137/504 |
|---|---|---|---|
| 3,521,934 | 7/1970 | Leiber | 303/119 |
| 3,532,391 | 10/1970 | Klein | 303/119 |
| 3,608,984 | 9/1971 | Skoyles | 303/10 X |
| 3,708,213 | 1/1973 | Skoyles | 188/181 A X |
| 3,724,914 | 4/1973 | Skoyles | 303/116 |

*Primary Examiner*—Douglas C. Butler
*Attorney, Agent, or Firm*—Robert S. Smith

[57] ABSTRACT

An anti-lock vehicle brake system includes a source of fluid pressure, a wheel brake connected to source of fluid pressure and an anti-lock control valve for relieving pressure at the brake. Sensing and control apparatus are provided for positioning the control valve. A restriction apparatus limits the flow of fluid pressure to the brake. A fluid flow control is provided intermediate the anti-lock control valve and the restriction apparatus for control of the restriction apparatus.

1 Claim, 5 Drawing Figures

ANTI-LOCK VEHICLE BRAKE SYSTEM WITH VARIABLE DECAY RATE

This application is a continuation of Ser. No. 421,511, filed Dec. 4, 1973, which was a continuation of Ser. No. 154,487, filed June 18, 1971, both of which now abandoned.

This invention relates to anti-lock brake systems for wheeled vehicles, that is, brake systems including means for improving braking performance of a vehicle by relieving braking pressure applied to a road wheel of the vehicle if the wheel tends to lock on a slippery surface following brake application and then increasing the braking pressure again without the need for any change in the actual braking action taken by a person using the brake. Such brake systems can be successful in reducing the risk of skidding due to wheel lock and in maintaining directional control during braking, and can also reduce braking distances.

The invention relates more particularly to anti-lock vehicle brake systems of the character comprising, for use in conjunction with a vehicle wheel and associated wheel brake, a fluid pressure source which in response to a braking action provides fluid under pressure via a fluid pressure connection to the brake, the fluid under pressure being effective to cause the brake to produce raking pressure at the wheel, an anti-lock control element which is actuated in response to an output from a wheel movement sensor, and a relief connection interconnected with the fluid pressure connection or with the brake and opened by the anti-lock control element, when the latter is actuated, to permit fluid flow from the fluid pressure connection or from the brake into the relief connection whereby to cause a reduction in the pressure of the fluid and thereby relieve braking pressure.

An anti-lock vehicle system of the above character may be either of the master cylinder type in which fluid in a master cylinder is pressurised by a piston when a braking action takes place to pressurise fluid in the fluid pressure connection, or of the continuously pumped type in which fluid under pressure is available continuously in the brake system and is "modulated" by a braking action such that the pressurised fluid is applied through the fluid pressure connection to the brake to an extent determined by the extent of modulation. Also, the braking action causing movement of the master cylinder piston or of the brake modulator, as the case may be, may be with or without servo or amplifier assistance. Having regard to the above the term "fluid pressure source" as used in this specification is to be construed accordingly.

In an anti-lock vehicle brake system of the above character the anti-lock control element remains actuated to relieve braking pressure for what will be termed an "anti-lock" period and is released at the end of this period to allow braking pressure to increase again. This operation to relieve braking pressure and then to allow it to increase again is repeated in successive anti-lock periods each time the wheel tends towards a locked condition that could result in skidding during braking action.

The initial volume of fluid displaced through the relief connection each time the anti-lock control element is actuated has to be sufficient to relieve braking pressure. Thereafter, during the time that the anti-lock control element is actuated, braking pressure will continue to decrease due to fluid pressure at the brake decaying at a rate which is a function of the size of an orifice which is opened by the anti-lock control element and of the progressively decreasing fluid pressure at the brake. For a given value of fluid pressure at the brake, a relatively high rate of decay can be chosen so that for a given duration of anti-lock period, braking pressure is reduced just sufficiently to allow a wheel which is braked on a slippery surface to recover. However, where such a choice is made, particularly in the case of a high pressure braking system (e.g. where wheel locking pressure on a good surface is around 1700 p.s.i.), the minimum practical duration of the anti-lock period may be so great as to result in fluid pressure at the brake decaying to a far lower value than that needed to allow a wheel which is braked on a good surface to recover. As a result, vehicle stopping distances on a good surface would be less than optimum due to the time taken in each anti-lock operation for the fluid pressure to build-up again to almost locking value. Conversely, it will be apparent that if a slower rate of decay of fluid pressure at the brake is chosen so as to provide optimum performance on a good surface, then the time taken to reduce braking pressure sufficiently to prevent locking on a slippery surface may be so great as to render a system unworkable on slippery surfaces. Hitherto, therefore, a compromise has had to be made in regard to the choice of the rate of decay of fluid pressure at the brake consequent upon actuation of the anti-lock control element.

In accordance with the present invention, there is provided an anti-lock vehicle brake system of the character referred to, wherein there is included in the relief connection fluid flow control means which is responsive to fluid displaced into the relief connection consequent upon actuation of the anti-lock control element to control the flow rate of this fluid such that, above a predetermined value of fluid pressure at the brake, the rate of decay of this fluid pressure is limited to a maximum value until this fluid pressure falls below said predetermined value.

The rate of decay of fluid pressure at the brake below the predetermined value will be, as aforesaid, a function of the size of orifice which is opened by the anti-lock control element and of the subsisting but progressively decreasing value of fluid pressure at the brake.

In carrying out the invention, said fluid flow control means is preferably so adapted as to provide an initial reduction in fluid pressure at the brake at a relatively high rate before controlling further decay of this fluid pressure substantially slower down to said predetermined value.

In one embodiment of the present invention the fluid flow control means comprises a spring-biassed piston which is located in the relief connection and is adapted to be displaced against its spring-biassing by the flow of fluid displaced into the relief connection, the piston including a restrictor element which is arranged so as beyond a certain displacement the piston enters and thereby restricts a section of the relief connection through which the displaced fluid passes, whereby after an initial surge of displaced fluid during which the displacement of the piston takes place subsequent flow of the fluid is reduced considerably by the penetration of the restrictor element into the section. The spring-biassing of the piston acts to overcome the force exerted on the piston by the flow of the displaced fluid when this flow corresponds to fluid pressure at the brake being at the predetermined value, so that the restrictor element is withdrawn from the section of the relief connection.

However, this embodiment is pressure-sensitive in that although it depends for its operation on the flow of the displaced fluid overcoming the spring-biassing of the piston, there is also a force exerted on the restrictor element by the pressure of the displaced fluid. As a result, instability can occur if the force exerted by this pressure exceeds the force exerted by the spring-biassing because the effect will be to hold the restrictor element in the section independently of the flow of displaced fluid.

In each of two further embodiments of the present invention, the fluid flow control means comprises a constant flow arrangement which gives a substantially constant rate of flow of displaced fluid through the relief connection independently of the pressure of the displaced fluid and thus of the pressure of fluid at the brake. Each of two different forms of this constant flow arrangement functions by, in effect, measuring the pressure drop, due to flow of displaced fluid, across a fixed restrictor and by using this pressure drop to control a variable restrictor to maintain a constant rate of fluid flow through the relief connection.

More specifically, in each of these two further embodiments the constant flow arrangement can comprise a spring-biassed flow measuring piston which is subjected to flow of displaced fluid in the relief connection and is displaceable against its spring-biassing when the force exerted by the latter is exceeded by the force exerted on the flow measuring piston by a pressure drop across it due to the rate of flow of displaced fluid, the flow measuring piston when thus displaced being adapted to restrict the flow of displaced fluid to a selected lesser rate, and the arrangement also including pressure balancing means for balancing the fluid pressure at the outlet side of the flow measuring piston with an equivalent fluid pressure so that continued displacement of the flow measuring piston is determined thereafter by the selected flow rate of the displaced fluid until the actual flow rate of the displaced fluid into the relief connection becomes less than the selected flow rate.

The selected flow rate of the displaced fluid thus determines the rate of decay of fluid pressure at the brake. In the limit condition, when this fluid pressure has fallen to the predetermined value, the force exerted on the flow measuring piston by its spring-biassing exceeds the opposing force due to the rate fluid of displaced fluid so that the flow measuring piston is thereafter rendered inoperable.

In further considering the nature of the invention, reference will now be made by way of example to the drawings of which:

Figure 1:
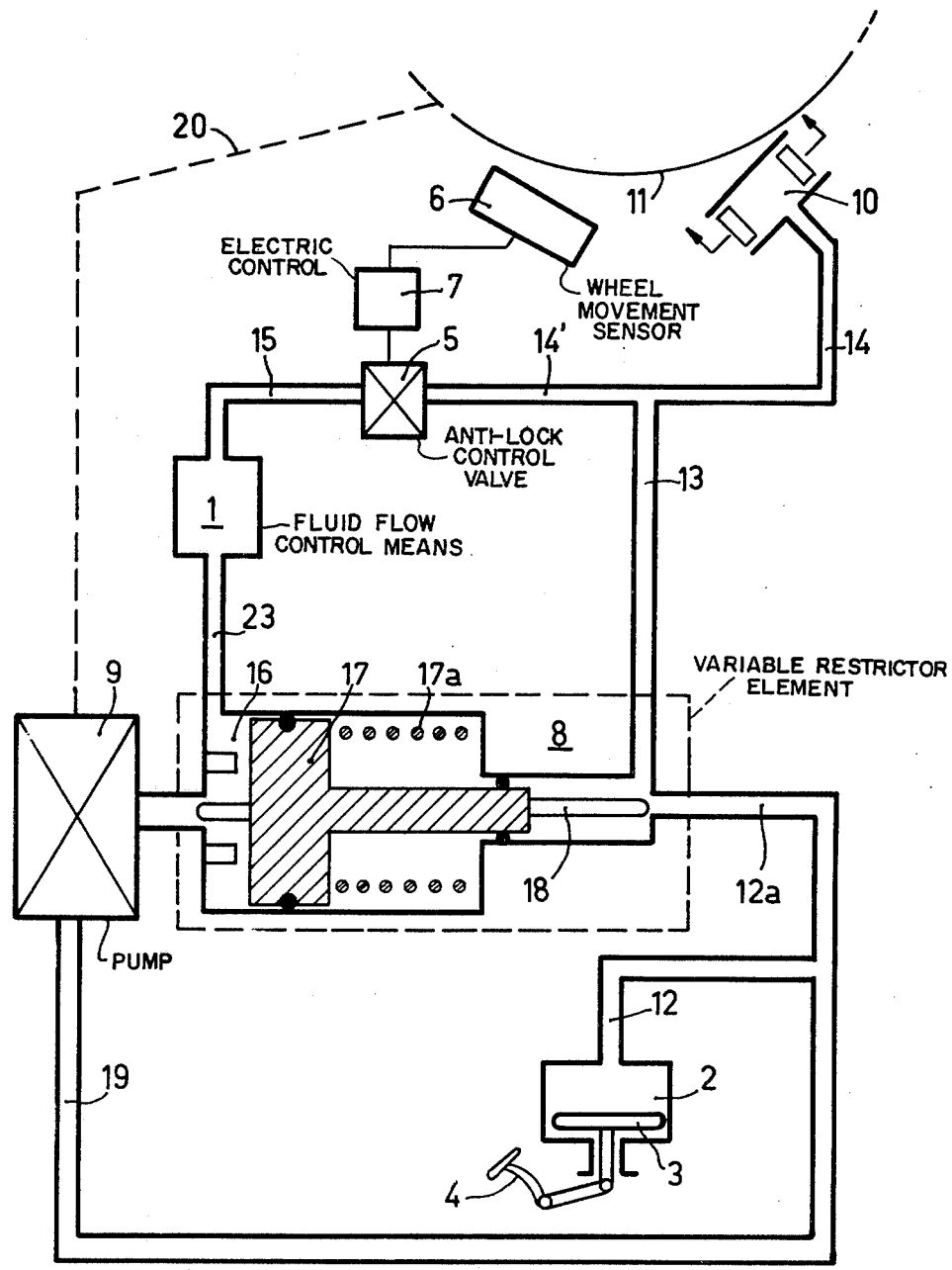
FIG. 1 shows diagrammatically an anti-lock vehicle brake system of the character referred to including fluid flow control valve means in accordance with the invention.

Referring to the drawing, in FIG. 1 a fluid flow control means 1 is provided in a particular form of anti-lock vehicle brake system. This system is a master cylinder type hydraulic system comprising a master cylinder 2 having a piston 3 actuated by a brake pedal 4. The system further comprises an anti-lock control valve 5, a wheel movement sensor 6, an electrical control arrangement 7, a variable restrictor element 8 and a scavenging pump 9. A vehicle brake 10 for a wheel 11 is controlled by the system.

In operation of the system of FIG. 1 for normal brake application, fluid in pressure lines 12, 12a, 13 and 14 is pressurized by the master cylinder 2 to an extent determined by a driver's braking action and this produces a corresponding braking pressure in the brake 10. If the driver's braking action is likely to cause skidding due to the wheel locking, this is detected by the wheel sensor movement sensor 6 and the electrical control arrangement 7, and the anti-lock control valve 5 is actuated. Details of the manner of the operation and the composition of the elements 5, 6 and 7 are not thought to be necessary for an understanding of the present invention.

As a result of the actuation of the anti-lock control valve 5, some of the fluid under pressure in the pressure lines 13 and 14 is displaced from the brake 10 into a relief connection 15, so that braking pressure is relieved. This fluid passes through the fluid flow control means 1 (the operation of which will be described presently) to a reservoir 16 of the variable restrictor element 8, where it is applied behind a spring-loaded plunger 17 and displaces this plunger 17 to the right (as shown in the drawing) so that a restrictor 18 on the plunger 17 enters the pressure line 12a thereby restricting flow of fluid through this line to the pressure line 13. Braking pressure is now reduced to an extent determined by the extent of displacement of the plunger 17 to the right and thus to the volume of displaced fluid. For normal anti-lock operation, the anti-lock control valve 5 remains actuated for only a short time required to allow the braking pressure to fall sufficiently low for the wheel to recover. Once the control valve 5 is released, the pump 9, which is returning fluid from the reservoir 16 of the variable restrictor element 8 to the pressure line 12a via pressure line 19, gradually removes sufficient fluid from the reservoir 16 for the plunger 17 to return under its spring loading towards its normal position to increase the rate of braking pressure build-up. As indicated by the broken line 20 the pump 9 can be driven by the wheel 11.

Figure 2:
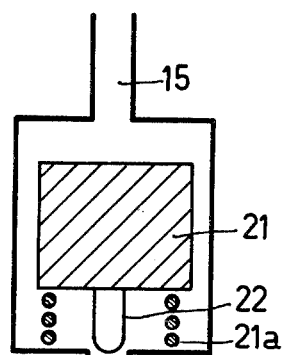
FIGS. 2, 3 and 4 show diagrammatically respective forms of fluid flow control valve means for the purpose of the invention.

From the foregoing description it will be appreciated that during the time that the control valve 5 remains actuated, fluid is being displaced through this control valve 5 to the relief connection 15. The fluid flow control means 1 can take any of the forms shown in FIGS. 2 to 4. The one shown in FIG. 2 comprises a spring-biassed piston 21 which is displaced against its spring-biassing by the flow of fluid displaced into the relief connection 15 when the anti-lock control valve 5 is first actuated. This displacement of the piston 21 is in a downward direction (as seen in the drawing) and the effect of this displacement is that a restrictor element 22 provided on the piston 21 enters a connection 23 leading to the reservoir 16. Thus, after the displacement of the piston 21, during which there is an initial surge of displaced fluid which results in an initial reduction of fluid pressure at the brake at a relatively high rate, the flow of fluid into the reservoir 16 is severely restricted by the penetration of the restrictor element 22 into the connection 23 so that the rate of decay of the fluid pressure at the brake is reduced considerably from what it would otherwise be. The rate of decay of fluid pressure at the brake is thus controlled until this fluid pressure drops to a predetermined value at which the force exerted on the piston 21 by the displaced fluid equals the force exerted by the spring-biassing. Thereafter, the restrictor element 22 is gradually withdrawn from connection 23 as fluid pressure at the brake decreases further due to the restrictive action of the restrictor 18 in the pressure line 12a. As the restrictor element 22 is withdrawn, the rate of flow of displaced fluid progressively changes until the piston 21 no longer controls the fluid flow through the control member.

Figure 3:
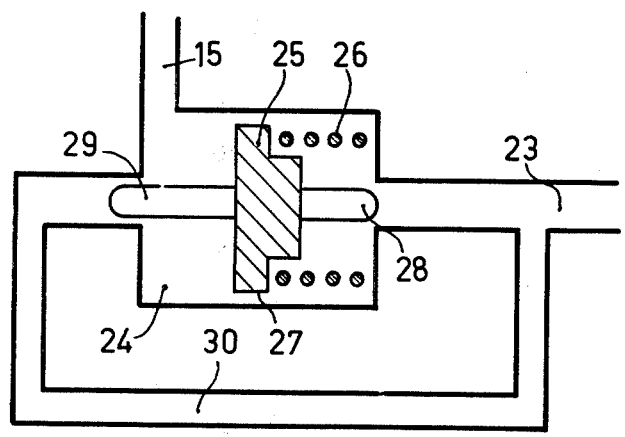

The fluid flow control means shown in FIG. 3 is connected, as indicated, between the relief connection 15 and the connection 23. It comprises a chamber 24 in which is freely accommodated a piston 25 which is spring-biassed by a spring 26 which acts to urge the piston 25 to the left (as seen in the drawing). An effective fixed restriction 27 is provided by the gap between the greatest diameter portion of the piston 25 and the wall of the chamber 24. The piston 25 has a first restrictor portion 28 which acts as a variable restrictor in the connection 23 when the piston 25 is displaced to the right, and a second restrictor portion 29 which acts as a restrictor in one end of a feed-back connection 30 which is interconnected with the connection 23 at its other end. The operation of this fluid flow control means is as follows.

Fluid displaced into the relief connection 15 enters the chamber 24 and flows past the piston 25 via the restriction 27 to the connection 23. This flow of fluid produces across the piston 25 a fluid pressure drop which produces a force acting on the piston 25 in opposition to the force exerted by the spring 26. When the flow rate of the displaced fluid increases to a value at which the fluid pressure drop across the piston 25 produces a force which exceeds the force exerted by the spring 26, the piston 25 is displaced to the right and the restrictor portion 28 enters the connection 23. Thereafter, the rate of flow of fluid is limited to a selected constant value which is determined by the force exerted by the spring 26 and by the dimensions of the restrictor 28 and the connection 23. The fluid pressure at the outlet side of the piston 25, that is, the fluid pressure in connection 23 is applied via the feedback connection 30 to the inlet side of the piston 25, that is, to the end of the restrictor portion 29, so that the outlet pressure is balanced by an equivalent inlet pressure. Thus, the positioning of the piston 25 in the chamber 24 is determined by the selected flow rate of the displaced fluid until the actual flow rate of the displaced fluid into the relief connection 15 becomes less than the selected flow rate. The selected flow rate of the displaced fluid thus determines the rate of decay of fluid pressure at the brake. When this pressure has fallen to a predetermined value, the force exerted on the piston 25 by its spring-biassing exceeds the opposing force due to the rate of fluid of displaced flow so that the piston 25 is thereafter rendered inoperable.

The limit condition when the fluid pressure at the brake is at said predetermined value may be respesented by the equation $$(P_1 - P_2)(A_1 - A_2)\eta f_s$$

where
$P_1$ = the pressure at the inlet side of the piston 25
$P_2$ = the pressure at the outlet side of the piston 25
$A_1$ = the piston area at the inlet side of the piston 25
$A_2$ = the area of the end of the restrictor portion 29
$f_s$ = the force exerted by the piston spring-biassing.

Figure 4:
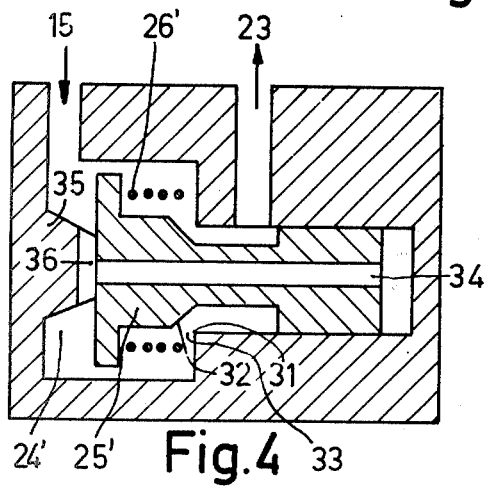

The fluid flow control means shown in FIG. 4 is similar in operation to that of FIG. 3, but differs in certain constructional details. In particular, the piston 25', in FIG. 4 does not have restrictor portions, but instead is formed to provide a valve 31 between a bevelled edge 32 of itself and a corner portion 33 formed in the chamber 24'. Also, instead of having a feedback connection 30, a pressure balance conduit 34 is formed in the piston 25' to provide a pressure balance path between opposite ends of the piston 25'. An end stop 35 in the chamber 24' for the piston 25 is formed with a slot 36 which serves to prevent sealing of the pressure balance conduit 34 when the piston 25' is urged by its spring-biassing into engagement with the end stop 35. Equivalently, the pressure balance conduit 34 could interconnect the small diameter end of the piston 25' with the other side of the greatest diameter portion of the piston 25', whichever is more convenient.

As in the embodiment of FIG. 3, the piston 25' is urged to the left (as seen in the drawing) by the spring 26'. Displaced fluid passes through the annular gap around the piston 25' and in so doing produces a pressure drop across the restriction formed by the flanged portion of the piston 25 which acts on the piston 25' in opposition to the force of spring 26'. If the flow rate of the displaced fluid is above a critical value (corresponding to a value of fluid pressure at the brake above said predetermined value), then the force produced by the pressure drop across flange of the the piston 25' will exceed the spring force. When this occurs, the piston 25' will move to the right and the valve 31 will restrict the flow of displaced fluid. Since the pressures at opposite ends of the piston 25' are equalised via the conduit 34, the reduction in pressure drop across flange of the the piston 25' due to the lessening of the fluid flow allows the spring force to tend to urge the piston 25' to the left. This causes an increase in the displaced fluid flow rate and thus an increase in the pressure drop across the piston 25' so that the latter tends to be urged to the right again, and so on, until a state of equilibrium is reached in which the flow rate of the displaced fluid is at the selected constant value.

Figure 5:
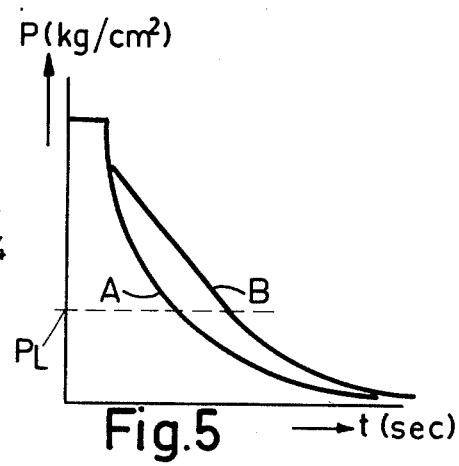
FIG. 5 shows pressure/time curves which are illustrative of the invention.

FIG. 5 shows a pressure/time curve which illustrates the effect the fluid flow control means of FIGS. 3 and 4 has on the rate of decay of fluid pressure at the brake. Curve A shows an exponential rate of decay which might be obtained without the fluid flow control means. Curve B shows a rate of decay which can be obtained with the fluid flow control means. It can be seen that this latter rate of decay is far slower and substantially linear for high initial values of pressure, than is the rate of decay for corresponding values of pressure in Curve A. For low values of pressure, below a predetermined value PL, the rates of decay in the two curves are more nearly the same. The curve B is substantially linear down to the predetermined value.

In the application of the invention to an anti-lock vehicle brake system of the form shown in FIG. 1, the fluid flow control means could be located between the anti-lock control valve 5 and the brake 10, instead of at the other side of the anti-lock control valve as shown, provided that it is on the anti-lock control valve side of the junction of connections 13 and 14. This connection portion 14' is effectively part of the relief connection through which fluid displaced from the brake 10 flows when the anti-lock control valve 5 is actuated.

What we claim is:

1. An anti-lock vehicle brake system for an associated vehicle having a plurality of wheels comprising: a source of fluid pressure, a wheel brake cooperating with at least one of said wheels, a first fluid conduit interconnecting said source of fluid pressure and said brake, an anti-lock control valve coupled to said first fluid conduit to relieve brake pressure when opened, sensing and control means connected to said control valve for detecting when one of said associated wheels tends to lock, said control valve opening responsive to said sensing and control means to allow fluid flow from said brake to relieve braking pressure therein, restricting means in said first fluid conduit for selectively restricting fluid flow to said brake from said source of fluid pressure, a second fluid conduit coupling said control valve to said restricting means, said restricting means being responsive to fluid flow from said brake through said control valve for restricting fluid flow from said source of fluid pressure to said brake to reduce fluid pressure delivered to said brake, and means connected in series with said control valve between said brake and said restricting means for controlling fluid flow through said control valve to said restricting means to a limited rate after an initial surge of fluid flow at a rate higher than said limited rate only during pressure values in said brake greater than a predetermined value to limit the rate of change of pressure in said brake, said means connected in series comprising a piston member, flow restricting means actuated by said piston member, spring means normally urging said piston member to a non-restricting position and pressure balancing means for balancing the fluid pressure on opposite sides of said piston.

* * * * *